United States Patent [19]

Johnson

[11] Patent Number: 4,974,645
[45] Date of Patent: Dec. 4, 1990

[54] NON-EXPULSIVE FUEL FILLER ASSEMBLY

[75] Inventor: Donald J. Johnson, Canton, Mich.

[73] Assignee: Ford Motor Company, Dearborn, Mich.

[21] Appl. No.: 462,524

[22] Filed: Jan. 9, 1990

[51] Int. Cl.⁵ .............................................. B65B 31/00
[52] U.S. Cl. ........................................ 141/59; 141/51; 141/46; 141/198; 137/587; 220/85 VS; 220/85 VR
[58] Field of Search ................... 141/51, 59, 44, 45, 141/46, 198; 220/85 VS, 85 VR, 86 R; 137/587, 588, 589

[56] References Cited

U.S. PATENT DOCUMENTS

| | | | |
|---|---|---|---|
| 3,385,468 | 5/1968 | Fleming et al. | 220/86 R |
| 3,394,842 | 7/1968 | Randolph | 220/86 R |
| 3,910,302 | 10/1975 | Sudhir | 220/85 VS |
| 4,444,230 | 4/1984 | Van Mullem | 141/198 |
| 4,483,367 | 1/1984 | Ross, Jr. et al. | 141/198 |
| 4,671,071 | 6/1987 | Sasaki | 141/45 |
| 4,700,864 | 10/1987 | Galles et al. | 220/86 R |
| 4,779,637 | 10/1988 | Ubaldi | 137/588 |
| 4,790,349 | 12/1988 | Harris | 141/46 |
| 4,874,020 | 10/1989 | Bucci | 141/59 |
| 4,917,145 | 4/1990 | Wawra et al. | 141/46 |

Primary Examiner—Ernest G. Cusick
Assistant Examiner—Edward C. Donovan
Attorney, Agent, or Firm—Kevin J. Heinl; Jerome R. Drouillard; Keith L. Zerschling

[57] ABSTRACT

A fuel filler assembly (10) for a fuel tank (12) of a vehicle including a filler tube (14) for directing fuel to the tank (12) and a vent tube (15). The vent tube (15) is closed by a float valve (24) when the tank is filled to capacity and an equalizing port (27) is provided in the vent tube (15) to balance the pressure between the upper portion of the filler neck and the vapor dome area of the tank. When pressure is relieved by removing the filler cap, relief valve (25) located above the float valve (24) and within the vapor dome of the fuel tank operates to allow pressure relief from the vapor dome of the fuel tank. A check valve (20) is provided in the filler tube (14) at the fuel tank (12). The check valve (20) in the filler tube (14) features a valve element (38) having cylindrical sides (39) and a hemispherical end (41) which is received in a housing (32) having cylindrical walls (34) and an annular seat (40) against which the hemispherical end (41) of the valve element (38) seals. The check valve (20) in the filler tube (14) is spring biased into a closed position with a force less than that required to automatically shutoff fuel dispensing.

10 Claims, 2 Drawing Sheets

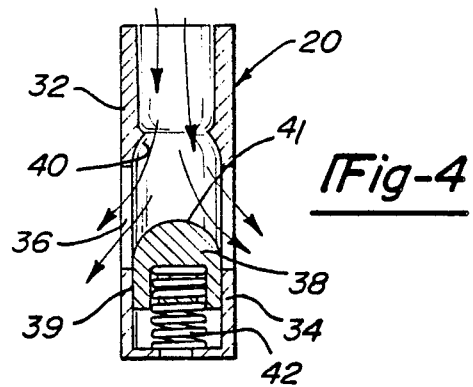
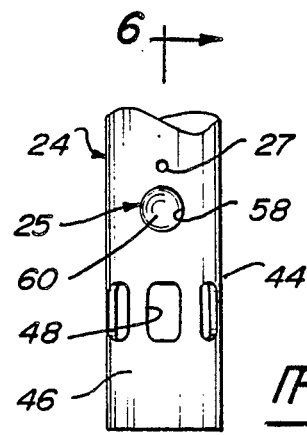
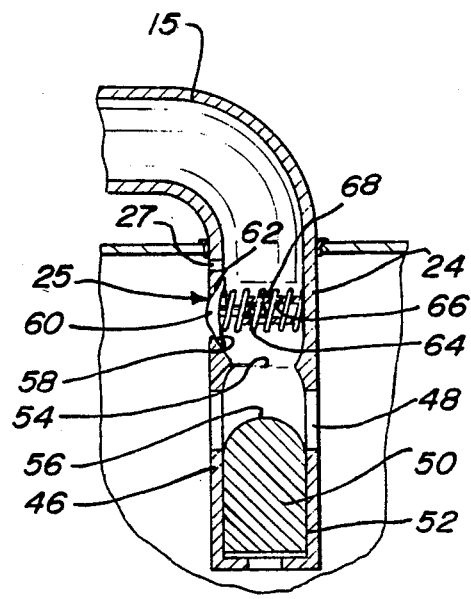
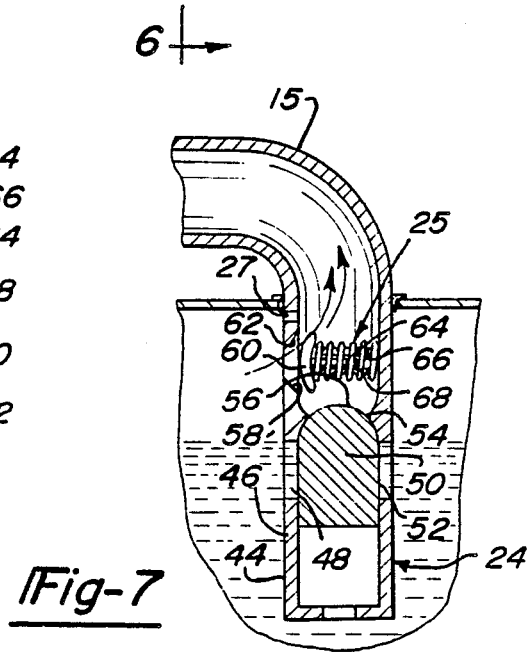

NON-EXPULSIVE FUEL FILLER ASSEMBLY

TECHNICAL FIELD

The present invention relates to a fuel filler assembly of a fuel tank for an automotive vehicle. More particularly, the present invention relates to a fuel filler assembly in which pressure is equalized to reduce the possibility of fuel expulsion.

BACKGROUND ART

Fuel filler assemblies are used in refueling automotive vehicles to allow fuel to be dispensed from a fuel dispensing nozzle into the fuel tank. Fuel filler assemblies include a filler tube through which fuel flows from the fuel dispensing nozzle to fill the fuel tank. A vent is provided to permit vapor in the tank to be displaced as fuel is supplied to the fuel tank.

Fuel dispensing nozzles normally include an automatic shutoff which is activated by a rapid build-up of pressure which is sensed at the dispensing end of the fuel dispensing nozzle. Fuel is normally dispensed at a rate of approximately 12 gallons per minute.

The problem of fuel expulsion, a rare occurrence wherein fuel is expelled from the fuel filler assembly, is more likely to occur when the level of fuel in the fuel tank is high and pressure is increased within the vapor dome formed between the top of the liquid level in the tank and the top of the tank. The pressure within the vapor dome may be increased by high ambient air temperatures or an increase in temperature of the vehicle as a result of extreme operating conditions. When the level of fuel in the tank is at or above the inboard end of the filler tube, removing the fuel filler cap may cause a sudden reduction in pressure at the outboard end of the filler tube, forcing fuel to be expelled upward and out through the filler tube.

The fuel filler assembly must cooperate with the fuel dispensing nozzle and its associated automatic fuel shutoff system. Automatic fuel shutoff systems of fuel dispensing nozzles include a sensor near the tip of the nozzle which senses any increase in pressure at the nozzle. When the fuel tank is filled, displaced vapor escapes from the tank through the vent tube. When the vent tube closes by operation of the float valve, a sudden increase in pressure occurs within the tank. This increase in pressure reduces the fuel flow rate within the filler tube causing fuel exiting the nozzle to flow backward around the nozzle sensor. The nozzle sensor then activates the dispenser shutoff and terminates flow of fuel through the nozzle.

To minimize the possibility of fuel expulsion, overfilling the fuel tank should be avoided. In addition, pressure build-up within the tank that would cause the level of fuel in the filler tube to rise should be avoided.

A problem with pressure equalization devices, including check valves, involves the need to calibrate check valves for effective operation at various pressure and temperature conditions. If a check valve is used to close the vent tube, as shown in U.S. Pat. No. 4,610,284 to Bartholomew, false triggering of the automatic shutoff will occur if the vent tube check valve is not properly calibrated.

Design simplicity is important in mass production of fuel filler assemblies. Dependability also is important to assure proper operation of the non-expulsive fuel filler assembly.

These and other problems are solved and advantages are realized by the present invention.

DISCLOSURE OF INVENTION

According to the present invention, a fuel filler assembly is disclosed for receiving fuel from a dispensing nozzle, and supplying the fuel to a fuel tank of a vehicle. The fuel filler assembly includes a filler tube and a vent tube. The filler tube has upper and lower ends with a dispensing nozzle affixed to the upper end of the filler tube and a lower end of the filler tube extending into the fuel tank. The lower end of the filler tube is fitted with a check valve which allows dispensed fuel to enter the fuel tank but resists the flow of fuel in the opposite direction whenever pressure at the tank end of the filler tube is greater than at the dispenser nozzle receptacle. The vent tube includes a first end which extends into the fuel tank through a top surface of the fuel tank and a second end which is in communication with the upper end of the filler tube. The vent tube includes a float valve assembly mounted on the first end of the vent tube which closes when the fuel tank is filled to capacity with fuel. The first end of the vent tube is also provided with means for equalizing pressure in a dome area defined within the fuel tank between the top surface of the fuel tank and the fuel in the fuel tank. The pressure in the dome area is equalized relative to the pressure in the fuel dispensing nozzle receptacle when the vent tube float valve assembly is closed. A pressure relief means is also provided on the first end of the vent tube to allow pressurized gases in the dome of the fuel tank to be rapidly ported through the vent tube when the filler cap is removed.

According to a preferred embodiment of the invention, the means for equalizing pressure is simply a small hole in the vent tube located above the vent tube float valve assembly and below the top surface of the fuel tank. The small hole gradually equalizes pressure between the dome area at the top of the tank and the top of the filler tube.

The pressure relief means is preferably a pressure relief valve which opens when pressure within the dome area substantially exceeds the pressure inside the vent tube such as when the filler cap is removed. The relief valve in the preferred embodiment is a spring-biased closure element which is normally closed but opens when the pressure in the dome exceeds the pressure in the vent tube by a predetermined amount.

The filler tube check valve generally includes a housing having cylindrical walls with slots formed in the walls through which fuel passes into the tank. An annular seat is provided at the top of the cylindrical walls of the housing. A valve element or plug is provided in the housing for opening and closing the check valve. The valve element preferably has cylindrical sides having a clearance fit relative to the cylindrical walls of the housing and a hemispherical end which is normally received by the annular seat to seal the filler tube. When fuel is ported through the filler tube from the fuel dispensing nozzle receptacle under pressure, the valve element is forced away from the annular seat allowing fuel to enter the fuel tank. A spring operatively interconnects the plug to the housing and biases the plug toward the annular seat. The spring force is at a relatively low level, less than the normal pressure at which fuel is dispensed and less than the normal pressure required to activate the automatic shutoff of the fuel dispensing nozzle.

The vent tube float valve assembly preferably includes a housing having cylindrical walls with openings formed therein through which fuel vapor escaping from the tank during filling is vented. An annular seat is disposed at the top of the cylindrical walls which is engaged by a float located in the housing. The float preferably has cylindrical sides which have a clearance fit relative to the cylindrical walls of the housing and a hemispherical end which is normally spaced from the annular seat but floats on the surface of the fuel to seal the vent tube when the fuel tank is filled. When the float seals against the annular seat, pressure is allowed to build-up temporarily within the fuel tank to activate the automatic fuel shutoff of the fuel dispensing nozzle.

According to another aspect of the present invention, a fuel tank filler shutoff, pressure equalization, and pressure relief system for a vehicle fuel tank is disclosed. The fuel tank is filled through a filler tube by a fuel dispensing nozzle equipped with an automatic shutoff system activated by an increase in pressure sensed by the nozzle. The fuel tank defines a closed vessel having a vapor pocket trapped in a dome at the top of the fuel tank above the fuel when the tank is filled to its design capacity. The system includes a vent tube which is opened on one end to the interior of the filler tube and closed on the other end by a float valve. The float valve is normally open but is closed when the fuel level in the fuel tank is at its design capacity. When the float closes, pressure is allowed to build-up within the fuel tank and thereby allows the automatic shutoff system to be triggered when the fuel tank is filled to its design capacity. A pressure equalizing means is provided according to the invention to equalize pressure between the dome of the fuel tank and the inside of the filler tube when the float valve is closed to reduce the possibility of any fuel within the tank from moving up into the filler tube toward the nozzle receptacle as a result of pressure build-up within the fuel tank. A pressure relief valve is provided to rapidly relieve pressure in the dome of the fuel tank through the vent tube when the filler cap is removed.

These and other advantages and objects of the invention will be better understood in view of the attached drawings and the following description.

BRIEF DESCRIPTION OF DRAWINGS

FIG. 4 is a cross-sectional view of the filler tube check valve in its open position wherein fuel is being supplied to the fuel tank;

FIG. 5 is a fragmentary side-elevational view of a vent tube float valve assembly;

FIG. 6 is a cross-sectional view taken along the line 6—6 in FIG. 5 showing the float valve in its normally open position; and FIG. 7 is a view similar to that of FIG. 6 with the float valve in its closed position and the pressure relief valve open.

BEST MODE(S) FOR CARRYING OUT THE INVENTION

Figure 1:
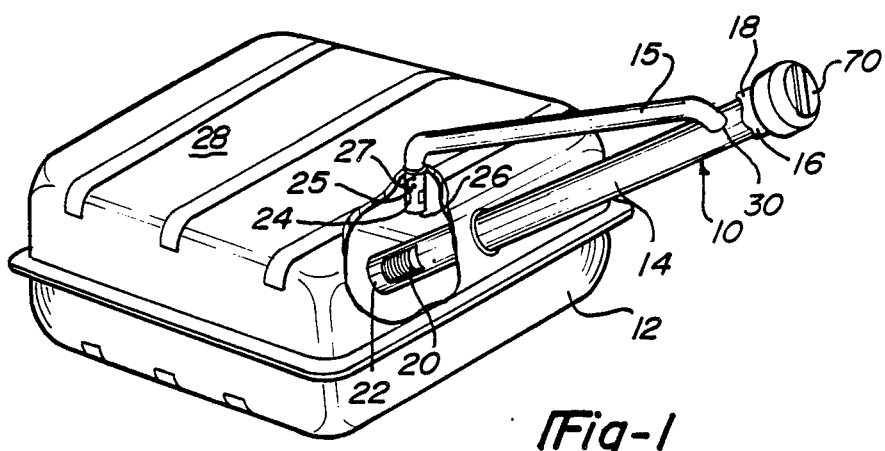
FIG. 1 is a perspective view of a fuel tank and fuel filler assembly.

Referring now to FIG. 1, the fuel filler assembly 10 is shown assembled to a fuel tank 12. The filler assembly 10 includes an filler tube 14 and a vent tube 15. A nozzle receptacle 16 designed to accept a fuel dispensing nozzle (not shown) is connected to the upper end 18 of the filler tube 14. A check valve 20 is connected to the lower end 22 of the filler tube 14 within the tank 12. A float valve 24 is affixed to the first end 26 of the vent tube 15. A pressure relief valve 25 is provided on the first end 26 of the vent tube 15. An equalizing port 27 is also provided on the first end 26 of the vent tube 15. The vent tube 15 extends through a top surface 28 of the fuel tank 12, and terminates at a second end 30 which is in vapor flow communication with the filler tube 14. The second end 30 of the vent tube 15 connects to t he filler tube 14 through the nozzle receptacle 16.

Figure 2:
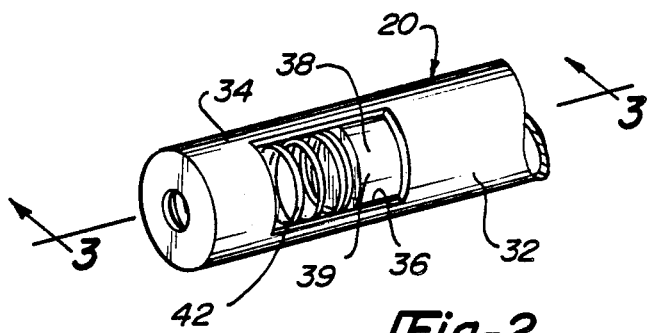
FIG. 2 is a fragmentary perspective view of a filler tube check valve.
Figure 3:
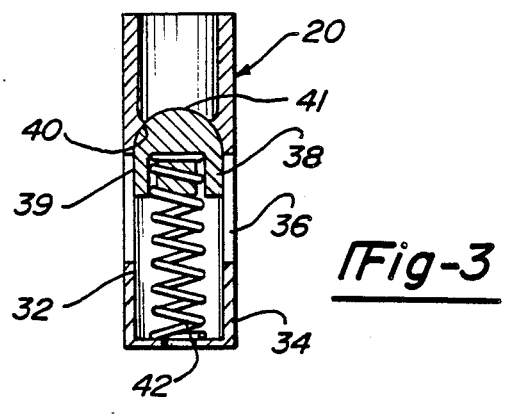
FIG. 3 is a cross-sectional view taken along the line 3—3 in FIG. 2.

Referring now to FIG. 2, check valve 20 is shown in greater detail. Check valve 20 includes a check valve housing 32 having cylindrical walls 34. Slots 36 are formed in the cylindrical walls 34 through which fuel may pass as it enters the gas tank. A valve element 38, or plug, having cylindrical sides 39 is housed within the housing 32. An annular seat 40 is provided on the interior of the check valve housing 32. A hemispherical end 41 is preferably provided on one end of the valve element 38. The hemispherical end 41 is designed to seal against annular seat 40. The valve element 38 is connected to a spring 42 which biases the valve element 38 into a closed position wherein the hemispherical end 41 of the valve element 38 is urged against the annular seat 40 to inhibit fuel from flowing into the filler tube 14. The closed position of the check valve 20 is illustrated in FIG. 3. The open position of the check valve 20, as shown in FIG. 4, wherein fuel is being dispensed under pressure into the fuel tank. The valve element 38 is displaced from the annular seat 40 and the spring force of the spring 42 is exceeded by the force of the fuel flowing down the filler tube 14.

Referring now to FIGS. 5, 6 and 7, the float valve 24 will be described in greater detail. The float valve 24 includes a float valve housing 44. The float valve housing 44 preferably is formed with cylindrical walls 46. Openings 48 are formed about the perimeter of the cylindrical walls 46 for the passage of vapors from the tank into the vent tube 15. A float 50 is contained within the float valve housing 44 in a normally open position as shown in FIG. 6. The float 50 is of less density than the fuel contained in the fuel tank so that it will float on the surface of the fuel when the fuel tank approaches its design fill capacity. The float 50 includes cylindrical sides 52 that are received within the cylindrical walls 46 in a clearance fit. An annular seat 54 is provided at the upper end of the float valve housing 44. The float 50 includes a hemispherical end 56 which is designed to seal off the vent tube by the hemispherical end contacting the annular seat 54.

A relief valve opening 58 is provided on the housing 44 above the openings 48. The relief valve opening 58 is preferably closed by a valve head 60. A valve seat 62 is formed on the inner end of the opening 58. A valve stem 64 is connected to the valve head 60. The valve stem 64 is received in a valve guide 66. The valve head is urged by a spring 68 into engagement with the valve seat 62 under normal circumstances. However, as shown in FIG. 7, when the tank is full and the float valve is in sealing engagement with the annular seat 54, a rapid reduction of pressure caused by removal of the filler cap 70 requires rapid relief of pressure from the dome of the fuel tank. When this happens, pressure is relieved directly to the upper end of the filler tube 14 through the vent tube 15.

Equalizing port 27 is provided to equalize pressure caused by high ambient temperatures or other operating conditions within the dome of the gas tank defined between the upper surface of the fuel and the top surface 28 of the gas tank, the pressure is equalized by the equalizing port 27 in the vent tube between the dome and the upper end of the filler tube. The equalizing port is always open so that relatively higher pressure gases in the dome do not force fuel upwardly through the filler tube 14. The equalizing port thereby reduces any possibility of fuel expulsion upon removal of the filler cap 70.

While the best mode of the invention has been described above and certain details have been disclosed for the purpose of illustrating the best mode for practicing the invention, it will be apparent to those skilled in the art that various changes and modifications may be made without departing from the spirit or scope of the invention as set forth in the following claims.

I claim:

1. A fuel filler assembly for receiving fuel from a dispensing nozzle and supplying the fuel to a fuel tank of a vehicle comprising:
    a fuel tank;
    a filler tube having an upper end and a lower end, a dispensing nozzle receptacle at said upper end, said lower end of said filler tube extending into the fuel tank;
    a filler cap adapted to seal the upper end of the filler tube;
    a vent tube having a first end extending into the fuel tank through a top surface of the fuel tank and a second end in communication with the upper end of said filler tube;
    a filler tube check valve mounted on the filler tube inside the fuel tank;
    a vent tube float valve assembly mounted on the first end of the vent tube which closes when the fuel tank is filled to capacity with fuel;
    means provided on the first end of the vent tube for equalizing pressure in a dome area within the fuel tank located between the top surface of the fuel tank and the fuel in the fuel tank relative to the pressure in said fuel dispensing nozzle receptacle when the vent tube float valve assembly is closed; and
    means provided on the first end of the vent tube for relieving pressure imbalance between the dome area within the fuel tank and atmospheric pressure when the cap is removed from the filler tube.

2. The fuel filler assembly of claim 1 wherein said means for equalizing pressure is a hole in the vent tube above the vent tube float valve assembly and below the top surface of the fuel tank.

3. The fuel filler assembly of claim 1 wherein said means for relieving pressure is a relief valve which opens when pressure in the vent tube is reduced to atmospheric pressure.

4. The fuel filler assembly of claim 3 wherein said relief valve is a spring-biased closure element which is normally closed but opens when the pressure in the vent tube is reduced to atmospheric pressure.

5. The fuel filler assembly of claim 1 wherein said filler tube check valve comprises:
    a housing having cylindrical walls, said cylindrical walls having openings formed therein, and an annular seat disposed at the top of the cylindrical walls;
    a valve element disposed in said housing having cylindrical sides having a clearance fit with the cylindrical walls of the housing and a hemispherical end which is normally received by the annular seat to seal the filler tube except for when fuel is ported through the filler tube from the fuel dispensing nozzle receptacle under pressure; and
    spring means operatively connecting the plug to the housing for biasing the valve element toward the annular seat, said valve element is biased at a rated pressure less than the normal pressure at which fuel is dispensed and less than the pressure required to automatically shutoff fuel dispensing.

6. The fuel filler assembly of claim 1 wherein said vent tube float valve assembly comprises:
    a housing having cylindrical walls, said cylindrical walls having openings formed therein, and an annular seat disposed at the top of the cylindrical walls;
    a float disposed in said housing having cylindrical sides having a clearance fit with the cylindrical walls of the housing and a hemispherical end which is normally spaced from the annular seat but floats on the surface of the fuel to seal the vent tube when the fuel tank is filled, allowing pressure to build up temporarily within the fuel tank to automatically shutoff the supply of fuel to the fuel tank.

7. The fuel filler assembly of claim 6 wherein said means for equalizing pressure is a port in the vent tube above the vent tube float valve assembly and below the top surface of the fuel tank.

8. The fuel filler assembly of claim 6 wherein said means for relieving pressure is a relief valve which opens when a pressure differential exists between a dome area within the fuel tank adjacent the underside of the top surface and the inside of the vent tube.

9. The fuel filler assembly of claim 8 wherein said relief valve is a spring-biased closure element which is normally closed but opens when the pressure differential exceeds a predetermined amount.

10. A fuel tank filling shutoff, pressure equalization, and pressure relief system adapted for use on a vehicle having a fuel tank of design capacity, said fuel tank being fillable through a filler tube by a fuel dispensing nozzle having an automatic shutoff system activated by an increase in pressure sensed by the nozzle, said fuel tank defining a closed vessel defining a dome of trapped vapor at the top of the fuel tank above the fuel when the tank is filled to its design capacity, said filler tube being closed by a filler cap, said system comprising:
    a vent tube on a first end extending into said fuel tank and a second end open to the inside of the filler tube;
    a float valve secured to said first end, said float valve being normally open to establish normal fluid flow communication between said fuel tank and said filler tube, said float valve closing when the fuel in the fuel tank is at said design capacity to allow pressure to increase within said dome and stop said normal fluid flow communication thereby allowing the automatic shutoff system to be activated;
    port means bypassing said float valve for equalizing pressure between said dome and said filler tube when the float valve is closed; and
    normally closed relief valve means bypassing said float valve for relieving pressure in said dome when the filler cap is removed, said relief valve means opening when said float valve is closed and said port means is insufficiently equalizing such pressure.

* * * * *